(12) United States Patent
Presler-Marshall

(10) Patent No.: US 6,532,492 B1
(45) Date of Patent: Mar. 11, 2003

(54) METHODS, SYSTEMS AND COMPUTER PROGRAM PRODUCTS FOR CACHE MANAGEMENT USING ADMITTANCE CONTROL

(75) Inventor: Martin Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,358

(22) Filed: Sep. 15, 1999

(51) Int. Cl.[7] ............................................. G06F 15/173
(52) U.S. Cl. ....................... 709/223; 709/203; 709/213; 709/214; 709/224; 709/245; 711/118; 711/216
(58) Field of Search ................................ 709/200–203, 709/213–215, 223–224, 227–229, 245–246, 315–316; 711/118–119, 129–130, 216

(56) References Cited

U.S. PATENT DOCUMENTS

| | | | |
|---|---|---|---|
| 4,695,949 A | | 9/1987 | Thatte et al. ................ 707/206 |
| 5,649,156 A | | 7/1997 | Vishlitzky et al. .......... 711/136 |
| 5,651,136 A | * | 7/1997 | Denton et al. .............. 711/118 |
| 5,713,001 A | * | 1/1998 | Eberhard et al. ........... 711/216 |
| 5,751,962 A | * | 5/1998 | Fanshier et al. ............ 709/223 |
| 5,774,660 A | | 6/1998 | Brendel et al. ............. 709/201 |
| 5,778,430 A | | 7/1998 | Ish et al. .................... 711/133 |
| 5,812,817 A | | 9/1998 | Hovis et al. ................ 711/173 |
| 5,862,338 A | * | 1/1999 | Walker et al. .............. 709/224 |
| 5,864,852 A | | 1/1999 | Luotonen .................... 709/246 |
| 5,875,453 A | | 2/1999 | Kojima ....................... 711/112 |
| 5,892,919 A | | 4/1999 | Nielsen ....................... 709/228 |
| 5,924,116 A | * | 7/1999 | Aggarwal et al. ........... 709/213 |
| 6,012,126 A | * | 1/2000 | Aggarwal et al. ........... 709/203 |
| 6,098,096 A | * | 8/2000 | Tsirigotis et al. ........... 709/213 |
| 6,154,811 A | * | 11/2000 | Srbljic et al. ................ 711/118 |
| 6,345,313 B1 | * | 2/2002 | Lindholm .................... 709/315 |

OTHER PUBLICATIONS

*Catching on the World Wide Web, IEEE Transactions on Knowledge and Data Engineering*, vol. 11, No. 1 Jan./Feb. 1999.

* cited by examiner

*Primary Examiner*—Bharat Barot
(74) *Attorney, Agent, or Firm*—Myers, Bigel, Sibley & Sajovec; A. Bruce Clay

(57) ABSTRACT

Methods, systems and computer program products are provided which apply a cache admittance protocol based on an address associated with a unit of information which has been requested, such as a URL associated with a particular file. Both an object cache, for containing the information to be cached, and an address cache, for determining whether a particular received unit of information should be stored in the object cache, are provided. The address cache utilizes a hashed address generated from the address associated with the unit of information. By providing an address cache based on a hashed address of a shorter length than the actual address, the memory required for the address cache may be reduced. Preferably, the length of the hashed address is selected so as to allow the address cache to reside in main memory rather than a secondary storage device, thereby providing for improved system performance. In a further aspect, large information units are placed in the object cache regardless of the admittance protocol. The admittance protocol is then applied only to smaller information units.

31 Claims, 3 Drawing Sheets

METHODS, SYSTEMS AND COMPUTER PROGRAM PRODUCTS FOR CACHE MANAGEMENT USING ADMITTANCE CONTROL

FIELD OF THE INVENTION

The present invention relates to communications and more particularly to cache management for supporting communications.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher, and content formats including plain text, Extensible Markup Language (XML), as well as image formats such as Graphics Interchange Format (GIF) and Joint Photographic Experts Group (JPEG).

An intranet is a private computer network conventionally contained within an enterprise and that conventionally includes one or more servers in communication with multiple user computers. An intranet may be comprised of interlinked local area networks and may also use leased-lines in a wide-area network. An intranet may or may not include connections to the outside Internet. Intranets conventionally utilize various Internet protocols and, in general, often look like private versions of the Internet. An intranet user conventionally accesses an intranet server via a Web browser running locally on his/her computer.

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other Web servers and files. When a user selects a particular hypertext link, a Web browser reads and interprets an address, called a Uniform Resource Locator (URL) associated with the link, connects the Web browser with a Web server at that address, and makes a request (e.g., an HTTP request) for the file identified in the link. The Web server then sends the requested file to the Web client which the Web browser interprets and displays to the user.

In communications between a client and a server, such as over the Internet, and in other applications involving transfers of large amounts of information over a communication channel, it is often desireable to improve the performance of the communication channel by reducing the volume of data which must be transferred. One known approach takes advantage of the fact that some communications contain redundant information, in other words, information which was previously communicated between a client and a server which has not changed in the time between the previous request initiating a transfer and a subsequent new request for the same information. For example, a Web browser may request a file with a particular associated URL address on multiple occasions. Various approaches using caches have been proposed which are intended to recognize when requested information is already available to the requesting device in a local cache. The web browser is then provided the locally available portion of the requested information from the local cache and only new information is transmitted to the requesting client over the communication channel.

An example of such a cache management system that provides for management of the contents of the cache to control the amount of memory required to support the cache is described in Charu Aggarwal, et al., "Caching on the World Wide Web", IEEE Transactions on Knowledge and Data Engineering, January/February 1999. As described in this article, HTTP caches suffer from the fact that a large number of requests they serve are for objects which will never be requested again before they expire. A proposed solution from the article is a cache admittance protocol which uses a second cache containing only the URLs which have been requested. The actual object would then be cached when a certain frequency of reference to the object has been seen by the cache.

One problem with the approach described in Aggarwal is the amount of storage required. The URLs typically take up approximately 0.3% of the size of the actual objects. Furthermore, it has been suggested that the URL cache should have a capacity (in number of objects) twice as large as the cache used for actual objects—or about 0.6% of total cache size. As object caches for modem HTTP caches are on the order of 100 gigabytes, this would require about 600 megabytes of storage for the URL cache. Using this approach and given the present hardware capabilities of typical existing equipment, the resulting URL cache generally has to be stored in a secondary storage device as opposed to main memory storage. This typically imposes a performance penalty as the URL cache is accessed and updated very frequently. It is expected, in a typical application, that approximately 50–70% of requests will not be served from the object cache and will, therefore, require accessing and updating the URL cache. A further problem of the protocol suggested in Aggarwal results from the nature of typical World Wide Web traffic. A significant percentage, generally at least 40%, of the bandwidth of a communication channel used for HTTP traffic is for large objects (100 kilobytes and larger) which are accessed very infrequently compared to smaller objects. As a result of the less frequent access to large objects, the Aggarwall cache admittance protocol will make it less likely for those objects to be cached, further reducing the effectiveness of the cache by not providing cache support at a desired level as larger objects tend to take up a significant amount of communication channel bandwidth for transmission. For a further discussion of cache management systems such as those described in Aggarwall, reference is made to U.S. Pat. No. 5,924,116 entitled "Collaborative Caching of a Requested Object by a Lower Level Node as a Function of the Caching Status of the Object at a Higher Level Node" which is incorporated herein by reference as if set forth in its entirety.

It has also been proposed in U.S. Pat. No. 5,864,852 entitled "Proxy Server Caching Mechanism That Provides a File Directory Structure and a Mapping Mechanism Within the File Directory Structure" ("the '852 patent") to use hashing to compress URLs to a fraction of their length. The compressed address is then used as a key for retrieving an associated object. However, the proposal of the '852 patent still stores the entire URL to check for collisions in an attempt to avoid errors as the proposal relates to object retrieval rather than admission control for a cache.

In light of the above discussion, a need exists for improvements in cache management protocols.

SUMMARY OF THE INVENTION

In view of the above discussion, it is an object of the present invention to provide methods, systems and computer program products which can provide for cache management with a reduced memory requirement to support the cache management protocol while still providing for improved performance of the supported communication channel.

A further object of the present invention is to provide such methods, systems and computer program products which can provide for a reduced usage of secondary storage devices in support of cache management.

These and other objects of the present invention may be provided by methods, systems and computer program products which take advantage of the fact that overall performance of the cache determines cache effectiveness and, therefore, a cache admittance protocol does not need perfect information, it only needs to be correct enough of the time to provide a significant benefit in the performance of a supported communication channel. Various embodiments of the present invention also take advantage of the nature of communications traffic on the Web.

In a first aspect, the present invention applies a cache admittance protocol based on an address associated with a unit of information (candidate object) which has been requested, such as a URL associated with a particular file. Both an object cache for containing the information to be cached and an address cache for determining whether a particular received unit of information should be stored in the object cache are provided. The address cache, unlike the prior art approaches described above, utilizes a hashed address generated from the address associated with the unit of information. By providing an address cache based on a hashed address of a shorter length than the actual address, the storage requirements of the address cache may be reduced. Preferably, the length of the hashed address is selected so as to allow the address cache to reside in main memory rather than a secondary storage device, thereby providing for improved system performance.

In a further aspect, the present invention applies the cache admittance protocol only to relatively small objects. As the impact of improved communication channel performance can be most readily provided by eliminating the need for large file size transfers which are often redundant information (such as screen layout, format and graphics characteristics provided to a Web browser), large information units are placed in the object cache regardless of the admittance protocol. The admittance protocol is then applied only to smaller information units which may reduce the storage requirements of the address cache by reducing the number of addresses tracked.

In one embodiment of the present invention, a method is provided for cache management including receiving a candidate object for placement in an object cache, the candidate object having an associated address of a first length. The associated address is hashed to provide a hashed address having a second length shorter than the first length. The hashed address is stored in an address cache which is used for controlling admittance to the object cache. Furthermore, the candidate object may be selectively admitted into the object cache responsive to hashed address information in the address cache.

In a further embodiment, the hashed address is stored to provide an address reference count associated with the hashed address and the candidate object is selectively admitted into the object cache if the address reference count associated with the hashed address of the candidate object satisfies a selection criteria. The object cache may be a Hypertext Transport Protocol (HTTP) object cache and the associated address may be a Universal Resource Locator (URL). The second length of the hashed address may be selected to allow the address cache to be maintained in a main memory of a device performing the cache management. The first length may be between about 40 to about 50 bytes and the second length may be about 4 bytes.

In another embodiment of the present invention the step of selectively admitting is preceded by the step of admitting the candidate object into the object cache if a size of the candidate object exceeds a predetermined criterion. The step of selectively admitting is then only performed if the size of the candidate object is no more than the predetermined criterion.

In a further embodiment of the present invention, a method for cache management is provided including receiving a candidate object for placement in an object cache, the candidate object having an associated size. The cache management protocol then determines if the size of the candidate object exceeds a predetermined criterion wherein the predetermined criterion is independent of an object to be replaced by the candidate object. The candidate object is admitted into the object cache responsive to the determining step if the size exceeds the predetermined criterion and submitted to controlled admittance testing responsive to the determining step if the size is less than the predetermined criterion. In one embodiment, the object cache is a Hypertext Transport Protocol (HTTP) object cache and the predetermined criterion is at least about 100 k bytes and, preferably, is about 100 k bytes. The candidate object is preferably only submitted to controlled admittance testing if the size is less than the predetermined criterion.

As will further be appreciated by those of skill in the art, while described above with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or computer program products for cache management using selective object admission based on an address cache utilizing a hashed address to provide a smaller address cache size and bypassing selective admission for objects exceeding a predetermined criterion. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
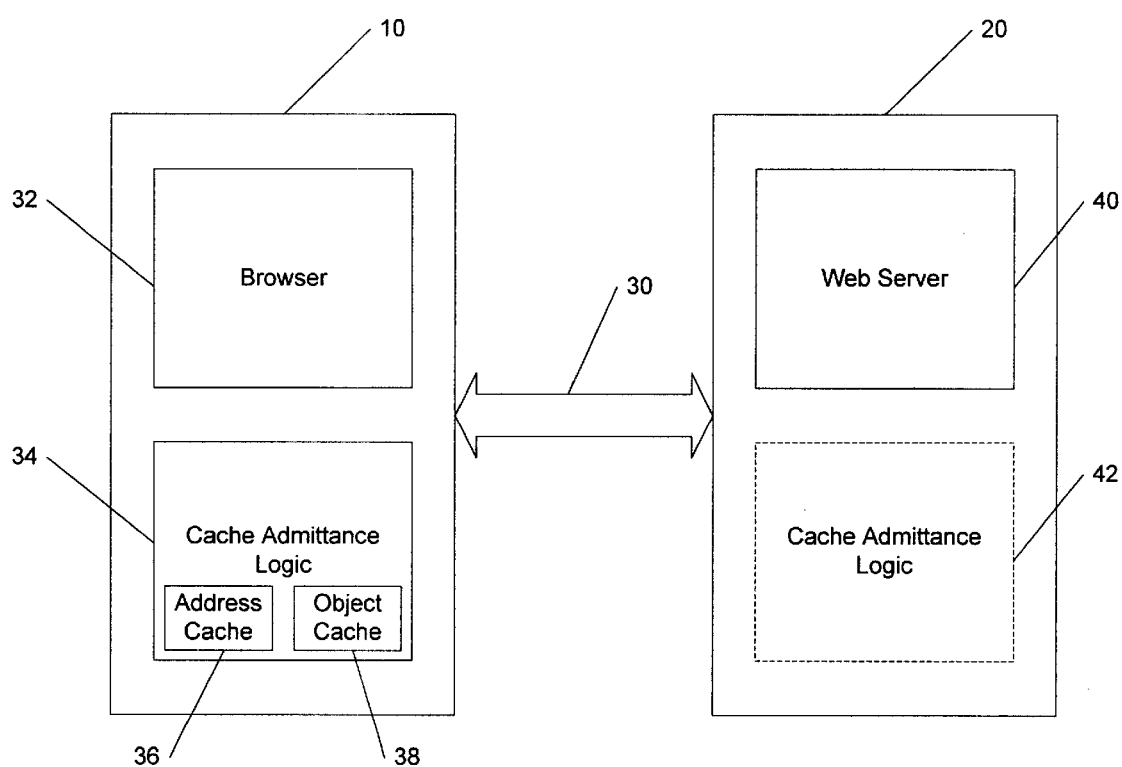
FIG. 1 is block diagram illustrating a client-server based communication channel including cache management according to an embodiment of the present invention.

Referring now to FIG. 1, a client-server communication environment incorporating cache management according to an embodiment of the present invention is illustrated. As shown in FIG. 1, a client 10 interacts and communicates with a server 20 over a communication channel 30. The client 20 includes an application, such as a browser 32, which communicates over the communication channel 30 with the server 20. For example, the browser 32 may be any number of known browser applications such as Netscape Navigator™ or Microsoft Internet Explorer™. The browser 32 may communicate with a server 20 over a communication channel 30 which is carried over the Internet using the HTTP protocol making requests for transfers of file objects from the server 20 by use of URL address identifiers.

As shown in FIG. 1, the client 10 also includes cache admittance logic 34. It is to be understood that while illustrated in FIG. 1 as a separate application, the cache admittance logic 34 may, alternatively, be implemented within the browser 32 to thereby support communications through browser 32. Furthermore, the operations of the cache admittance logic 34 are preferably provided by software code executing on the client 10 but may also be implemented in whole, or in part, in hardware such as custom design chips. The cache admittance logic 34 supports various cache management functions, more particularly controlling the admittance of objects into the object cache 38 which is used by the browser 32 to support communications between the client 10 and the server 20 over the communication channel 30. As the cache management function to which the present invention is directed relates to the cache admittance protocol, the other aspects of operation of the object cache 38 as used to support communications will not be described further herein. However, for additional details and description of the operation of the object cache 30 in connection with communications by the client 10 over the communication channel 30, reference is made to U.S. Pat. No. 5,924,116 in which a particular embodiment of cache operations which may be used beneficially with the cache admittance methods, systems and computer program products of the present invention is more fully described.

As will be described more fully with reference to FIG. 3, the cache admittance logic 34 further includes an address cache 36. The address cache 36 is used to support cache admittance operations linked to the frequency of reference to a particular object. While the present invention is directed in one aspect to the format of the address cache 36, it is not limited to any specific embodiment of the details of the protocol used to evaluate a frequency of reference for a particular object in connection with the use of the cache admittance logic 34 in support of an on-going communication over the communication channel 30. Accordingly, the details of the use of the address cache 36 will only be discussed herein to the extent they are directly related to the cache management operations of the present invention. However, additional description of the details of use of address caches in connection with cache management according to a prior art embodiment to which the present invention may be applied to obtain improved performance is described in U.S. Pat. No. 5,924,116, particularly with reference to FIG. 10 and the related portions of the specification.

Also shown in FIG. 1 is a web server 40 on the server 20 which supports communications with the browser 32 of the client 10 over the communication channel 30. In addition, an optional cache admittance logic 42 is illustrated as being included in the server 20. While the cache admittance logic 42 will not be further described herein, it is to be understood that various cache management protocols provide for the use of a cache to reduce communication flow not only from the server 20 to the client 10 but also with reference to reduction of the volume of data transferred from the client 10 to the server 20. Accordingly, for embodiments in which cache management is applied to both directions of traffic over the communication channel 30, it is to be understood that the description provided herein of operations of the cache admittance logic 34 may further be applied to the cache admittance logic 42. Furthermore, it is to be understood that, for example, the web server 40 may be a proxy server and, therefore, appear as a client to upstream servers. Thus, the cache admittance logic 42 in server 20 can cache responses received by server 20 in response to requests from browser 32. The cache responses may subsequently be provided to browser 32 without requiring web server 40 to forward requests to the upstream system.

The embodiment illustrated in FIG. 1 shows a particular environment in which the present invention may be beneficially applied. More particularly, the object cache 38 in the embodiment of FIG. 1 is a HTTP object cache. Furthermore, the associated address for objects to be transferred on the communication channel 30 is a URL which typically has an expected associated length of the URL from between about 40 to about 50 bytes. Note that this reference length for the URL refers to the length of the cachable URL stored in an address cache such as described in U.S. Pat. No. 5,924,116.

Figure 2:
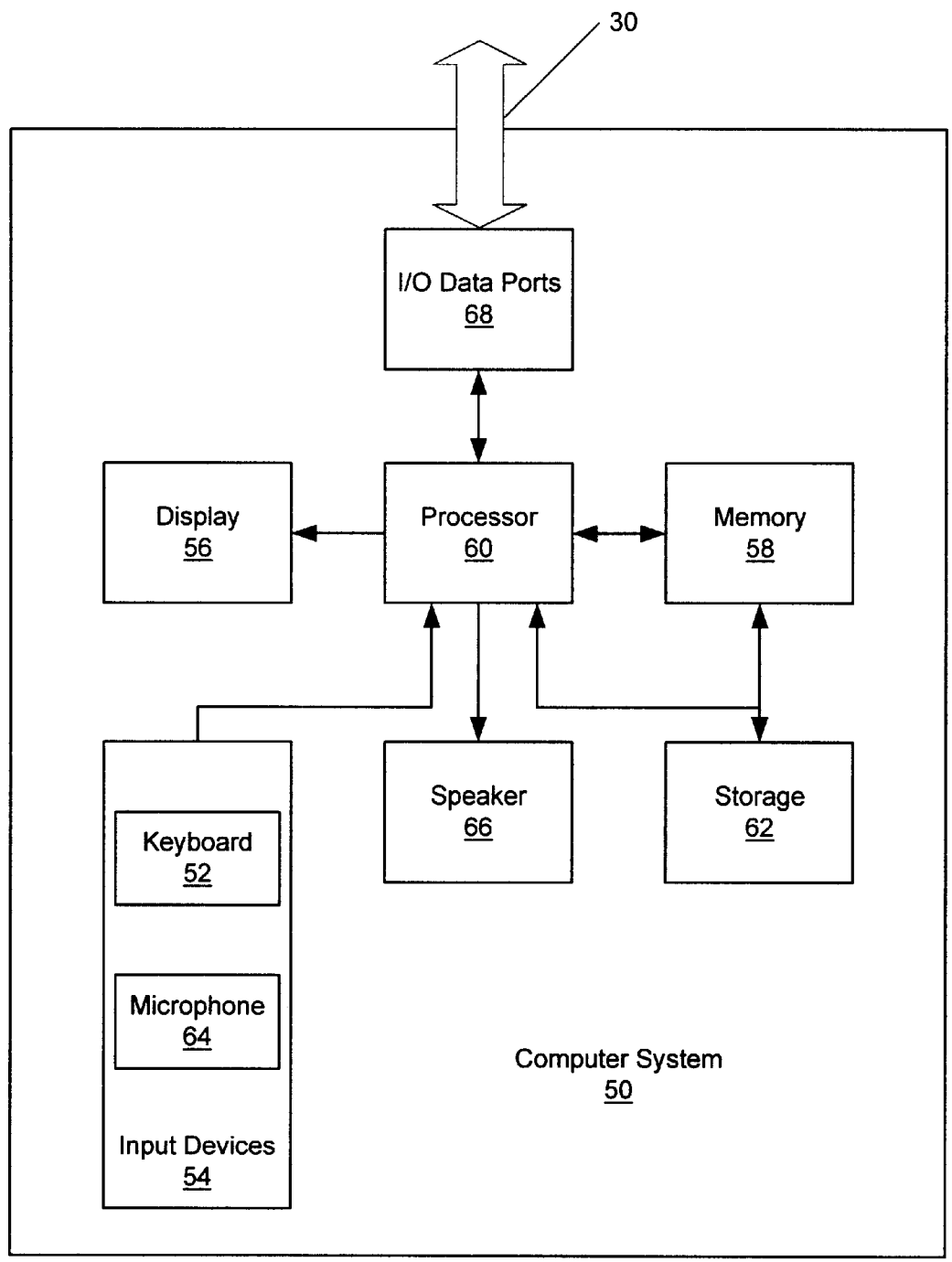
FIG. 2 is a block diagram illustrating an embodiment of a client or a server according to the present invention supporting cache management.

Referring now to FIG. 2, an exemplary embodiment of a computer system 50 suitable for use as a client 10 or a server 20 in accordance with the present invention is illustrated. The computer system 50 may include input devices 54, such as a keyboard or keypad 52 and/or a microphone 64. The computer system 50 also preferably includes a display 56 and a main memory 58 that communicate with a processor 60. The computer system 50 may further include a speaker 66 and an I/O data port(s) 68 that also communicate with the processor 60. The I/O data ports 68 provide the physical layer support for communications between the client 10 and the server 20 over the communication channel 30 as described previously.

FIG. 2 also illustrates that the computer system 50 may include a secondary storage device 62 which communicates with the main memory 58 and the processor 60. Such a secondary storage device may be any type of data storage device as described above which is not main memory. These components are included in many conventional computer systems (e.g., desktop, laptop, or handheld computers) suitable for operating as a client 10 or a server 20 and their functionality is generally known to those skilled in the art.

The processor 60 executes the browser application 30 and further may support the cache admittance logic 34 functions for a client 10 or the corresponding operations for a server 20 as described above with reference to FIG. 1. The object cache 38 will typically be of a sufficient size that it is stored in the secondary storage device 62. Preferably, the hash address length used with the address cache 36 is selected so as to provide a size for the address cache 36 allowing the address cache 36 to be stored in the main memory 58 rather than in the secondary storage device 62. Furthermore, a single computer system 50 may operate as both a client 10 and a server 20 for different communication sessions.

While the present invention is described with respect to the computer system 50, as will be appreciated by those of skill in the art, the present invention may be incorporated into many other devices where management of a cache is desired and, thus, may comprise an embedded function in many other devices. Thus, the present invention should not be construed as limited to use in computer systems such as illustrated in FIG. 2 but may be incorporated in any device having sufficient processing capabilities to carry out the operations described below. Examples of such devices include computing devices such as Personal Digital Assistants (PDAs), laptop and portable computers, pen-based portable computer, wireless telephones, smart phones, screenphones, copiers and other office equipment, appliances, factory controllers, etc.

The present invention will now be described with respect to the flowchart illustration of FIG. 3. FIG. 3 illustrates an embodiment of operations according to the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

Figure 3:
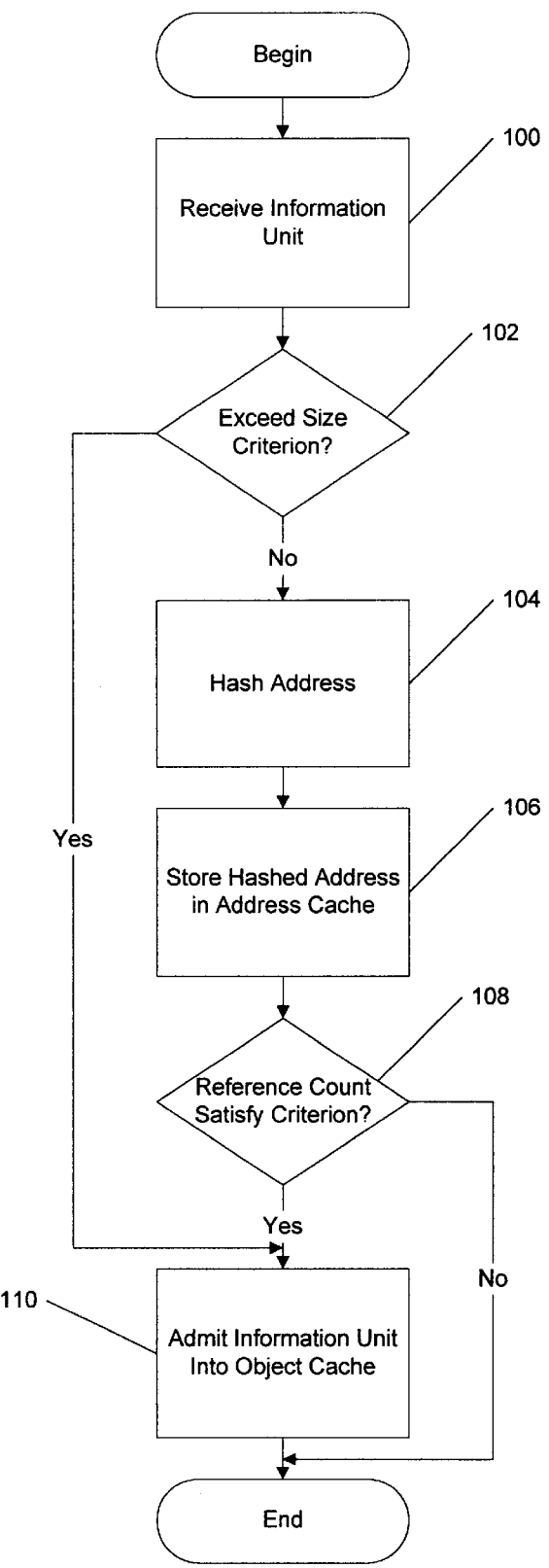
FIG. 3 is a flowchart illustrating operations according to one embodiment of the present invention for cache management.

FIG. 3 illustrates an embodiment of the present invention which provides for selective cache admission based on reference to a hashed address linked address cache 36 and further provides for bypassing of the cache admittance protocol and storage in the object cache 38 of any received object exceeding a predetermined size criterion. Operations begin at block 100 when the client 10 receives a candidate object (information unit) for placement in the object cache 38. The received candidate object has an associated address of a first length: More particularly, in one embodiment, the associated address for the candidate object is a URL address. The cache admittance logic 34 then determines if the size of the candidate object exceeds a predetermined criterion (block 102). The candidate object is admitted into the object cache 38 responsive to the determining operations at block 102 if the size exceeds the predetermined criterion (block 110). In other words, a particular candidate object is only subjected to the cache admittance operations of block 104 through block 108 if the size of the candidate object is less than the predetermined criterion as determined at block 102. The predetermined criterion used at block 102 in an embodiment of the present invention in which the object cache 38 is an HTTP object cache is at least about 100 kilobytes, and, more preferably, is about 100 kilobytes. Furthermore, while a fixed predetermined criterion may be utilized, a dynamic predetermined criterion may also be utilized based on historical object size. For example, the predetermined criterion could be established as the object size corresponding to a fixed percentage, such as 10%, of the requested objects based on historical object sizes. Thus, the object size criterion may be adjusted based on historical data to increase the efficiency of the cache admittance procedure or to assure that the address cache may reside in the main memory 58 without resulting in an unacceptable level of hash collisions.

If the candidate object does not exceed its predetermined criterion (block 102), the associated address for the candidate object is hashed to provide a hashed address having a second associated length which is shorter than the length of the associated address of the candidate object (block 104). In one embodiment of the present invention wherein the object cache is an HTTP cache and the associated address of a receive candidate object is a URL address, the preferred hashing protocol is the "hashpjw" protocol as described on pages 435–438 of the reference "Compilers Principles, Techniques, and Tools", by Alfred V Aho, Ravi Sethi, and Jeffrey D. Ullman, Addison-Wesley, 1987 which is incorporated herein by reference as if set forth in its entirety.

In this embodiment, in which the URL address is expected to be about 40–50 bytes, the hashed address is preferably provided with a length of about 4 bytes. More particularly, the length of the hashed address is preferably selected to allow the address cache 36 to be maintained in the main memory 58 rather than being located in the secondary storage device 62, thereby allowing for potential performance improvements in operation of the client 10.

The hashed address is then stored in the address cache 36 for use in controlling admittance to the object cache 38. More particularly, the hashed address is stored in a manner to provide an address reference count (frequency) associated with the hashed address. It is to be understood that various approaches to storing the hashed address may be implemented in accordance with the present invention which will generally be referred to herein as providing an "address reference count.". For example, the address cache 36 may contain entries which include the full hashed address. Alternatively, the address cache 36 may be structured with address locations providing bins associated with a particular hashed address and storing the hashed address may then be provided by incrementing a bin count or providing a time stamp for determining a reference frequency within the appropriate address location of the address cache 36. One methodology for record storage and updating in an address cache suitable for use with the present invention is described in U.S. Pat. No. 5,924,116 in connection with the structure of an address cache based on the use of a URL address as contrasted with the hashed address of the present invention. Preferably, the hashed addresses become keys which are associated with a reference count (associated value). Various approaches to storing key-value pairs suitable for use with the present invention are known to those of ordinary skill in the art and need not be further described herein.

In addition to updating the address cache 36 as described with reference to block 106, cache management operations according to the illustrated embodiment of the invention in FIG. 3 further include determining if the address reference count associated with the hashed address information in the address cache 36 satisfies a selection criteria (block 108) and selectively admitting the candidate object into the object cache 38 if the selection criterion is satisfied (block 110). Various approaches to controlling adding of objects to an object cache are known to those of skill in the art which are suitable for use with the present invention. However, such approaches will not be described further herein as the present invention is directed to admittance operations rather than the retrieval of objects from the object cache. In any event, in any implementation of the present invention, provision is preferably made for proper cache management as to aspects other than admission as described herein to assure that correct retrieval operations may be executed independent of the admission operations described herein.

As described above, the present invention may provide for improved performance in cache admittance operations based upon the use of a hashed address rather than an actual URL address in connection with the address cache 36. For example, in a particular embodiment where the cachable URL is generally approximately 40–50 bytes in length and a 32 bit hash is employed, slightly more than an order of magnitude reduction may be provided in the data size for the address cache 36. The reduction in address size does, however, create an opportunity for collisions to occur silently, i.e., without being detected as having occurred. In the event of such a hash collision, i.e., when the URLs (URL-1 and URL-2) both have the same hash value, the URLs (URL-1 and URL-2) would each be admitted to the cache when they otherwise would not have been with a perfect implementation without collision. However, utilizing a hash protocol of a good quality such as that recommended above, these collisions are expected to be rare enough that the penalty of undesired stores in the object cache will be outweighed by the benefits of a reduced address cache 36 size and overall system performance. This is particularly true as caching itself is inevitably inexact as it is itself an attempt to make predictions about the future and, therefore, minor inaccuracies are an acceptable performance trade off given the benefits of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for cache management comprising the steps of:

receiving a candidate object for placement in an object cache for a communication channel, the candidate object having an associated address of a first length;

hashing the associated address to provide a hashed address having a second length shorter than the first length; and storing the hashed address in an address cache which is used for controlling admittance to the object cache.

2. A method according to claim 1 wherein the receiving step is followed by the step of selectively admitting the candidate object into the object cache responsive to hashed address information in the address cache.

3. A method according to claim 2 wherein the step of storing the hashed address comprises the step of storing the hashed address to provide an address reference count associated with the hashed address and wherein the step of selectively admitting comprises the step of selectively admitting the candidate object into the object cache if the address reference count associated with the hashed address of the candidate object satisfies a selection criteria.

4. A method according to claim 3 wherein the step of selectively admitting is preceded by the step of admitting the candidate object into the object cache if a size of the candidate object exceeds a predetermined criterion and wherein the step of selectively admitting is only performed if the size of the candidate object is no more than the predetermined criterion.

5. A method according to claim 3 wherein the step of selectively admitting is preceded by the steps of:

determining if a size of the candidate object exceeds a predetermined criterion; and admitting the candidate object into the object cache responsive to the determining step if a size of the candidate object exceeds a predetermined criterion; and wherein the step of selectively admitting is performed responsive to the determining step if the size of the candidate object is no more than the predetermined criterion.

6. A method according to claim 3 wherein the object cache is a Hypertext Transport Protocol (HTTP) object cache and wherein the associated address is a Universal Resource Locator (URL).

7. A method according to claim 6 wherein the step of hashing the associated address comprises the step of hashing the associated address to provide a hashed address wherein the second length is selected to allow the address cache to be maintained in a main memory of a device executing the method for cache management.

8. A method according to claim 6 wherein the first length is between about 40 to about 50 bytes and wherein the second length is about 4 bytes.

9. A method for cache management comprising the steps of:
  receiving a candidate object for placement in an object cache, the candidate object having an associated size;
  determining if the size of the candidate object exceeds a predetermined criterion wherein the predetermined criterion is independent of an object to be replaced by the candidate object;
  admitting the candidate object into the object cache responsive to the determining step if the size exceeds the predetermined criterion; and
  submitting the candidate object to controlled admittance testing responsive to the determining step if the size is less than the predetermined criterion.

10. A method according to claim 9 wherein the object cache is a Hypertext Transport Protocol (HTTP) object cache and wherein the predetermined criterion is at least about 100 k bytes.

11. A method according to claim 10 wherein the predetermined criterion is about 100 k bytes.

12. A method according to claim 9 wherein the candidate object has an associated address of a first length and wherein the step of submitting comprises the steps of:
  hashing the associated address to provide a hashed address having a second length shorter than the first length;
  storing the hashed address in an address cache which is used for controlling admittance to the object cache to provide an address reference count associated with the hashed address; and
  selectively admitting the candidate object into the object cache if the address reference count associated with the hashed address of the candidate object satisfies a selection criteria.

13. A method according to claim 9 wherein the submitting step comprises the step of submitting the candidate object to controlled admittance testing only if the size is less than the predetermined criterion.

14. A system for cache management comprising:
  means for receiving a candidate object for placement in an object cache for a communication channel, the candidate object having an associated address of a first length;
  means for hashing the associated address to provide a hashed address having a second length shorter than the first length; and
  means for storing the hashed address in an address cache which is used for controlling admittance to the object cache.

15. A system according to claim 14 further comprising means for selectively admitting the candidate object into the object cache responsive to hashed address information in the address cache.

16. A system according to claim 15 wherein the means for storing the hashed address comprises means for storing the hashed address to provide an address reference count associated with the hashed address and wherein the means for selectively admitting comprises means for selectively admitting the candidate object into the object cache if the address reference count associated with the hashed address of the candidate object satisfies a selection criteria.

17. A system according to claim 16 wherein the means for selectively admitting comprises:
  means for determining if a size of the candidate object exceeds a predetermined criterion; and
  means for admitting the candidate object into the object cache responsive to the means for determining if a size of the candidate object exceeds a predetermined criterion.

18. A system according to claim 16 wherein the object cache is a Hypertext Transport Protocol (HTTP) object cache and wherein the associated address is a Universal Resource Locator (URL).

19. A system according to claim 18 wherein the means for hashing the associated address comprises means for hashing the associated address to provide a hashed address wherein the second length is selected to allow the address cache to be maintained in a main memory of the system for cache management.

20. A system according to claim 19 wherein the first length is between about 40 to about 50 bytes and wherein the second length is about 4 bytes.

21. A system for cache management comprising:
  means for receiving a candidate object for placement in an object cache, the candidate object having an associated size;
  means for determining if the size of the candidate object exceeds a predetermined criterion wherein the predetermined criterion is independent of an object to be replaced by the candidate object;
  means for admitting the candidate object into the object cache responsive to the means for determining when the size exceeds the predetermined criterion; and
  means for submitting the candidate object to controlled admittance testing responsive to the means for determining when the size is less than the predetermined criterion.

22. A system according to claim 21 wherein the object cache is a Hypertext Transport Protocol (HTTP) object cache and wherein the predetermined criterion is at least about 100 k bytes.

23. A computer program product for cache management comprising:
  a computer readable storage medium having computer readable program code embodied in said medium, said computer readable program code comprising:
  computer readable code which receives a candidate object for placement in an object cache for a communication channel, the candidate object having an associated address of a first length;
  computer readable code which hashes the associated address to provide a hashed address having a second length shorter than the first length; and
  computer readable code which stores the hashed address in an address cache which is used for controlling admittance to the object cache.

24. A computer program product according to claim 23 further comprising computer readable code which selectively admits the candidate object into the object cache responsive to hashed address information in the address cache.

25. A computer program product according to claim 24 wherein the computer readable code which stores the hashed address comprises computer readable code which stores the hashed address to provide an address reference count associated with the hashed address and wherein the computer readable code which selectively admits comprises computer readable code which selectively admits the candidate object into the object cache if the address reference count associated with the hashed address of the candidate object satisfies a selection criteria.

26. A computer program product according to claim 25 wherein the computer readable code which selectively admits comprises:

computer readable code which determines if a size of the candidate object exceeds a predetermined criterion; and computer readable code which admits the candidate object into the object cache responsive to the computer readable code which determines if a size of the candidate object exceeds a predetermined criterion.

27. A computer program product according to claim 25 wherein the object cache is a Hypertext Transport Protocol (HTTP) object cache and wherein the associated address is a Universal Resource Locator (URL).

28. A computer program product according to claim 27 wherein the computer readable code which hashes the associated address comprises computer readable code which hashes the associated address to provide a hashed address wherein the second length is selected to allow the address cache to be maintained in a main memory of the system for cache management.

29. A computer program product method according to claim 28 wherein the first length is between about 40 to about 50 bytes and wherein the second length is about 4 bytes.

30. A computer program product for cache management comprising:

a computer readable storage medium having computer readable program code embodied in said medium, said computer readable program code comprising:

computer readable code which receives a candidate object for placement in an object cache, the candidate object having an associated size;

computer readable code which determines if the size of the candidate object exceeds a predetermined criterion wherein the predetermined criterion is independent of an object to be replaced by the candidate object;

computer readable code which admits the candidate object into the object cache responsive to the computer readable code which determines when the size exceeds the predetermined criterion; and computer readable code which submits the candidate object to controlled admittance testing responsive to the computer readable code which determines when the size is less than the predetermined criterion.

31. A computer program product according to claim 30 wherein the object cache is a Hypertext Transport Protocol (HTTP) object cache and wherein the predetermined criterion is at least about 100 k bytes.

* * * * *